United States Patent
Jain et al.

(10) Patent No.: US 8,179,887 B1
(45) Date of Patent: May 15, 2012

(54) METHOD AND APPARATUS FOR IMPROVING PERFORMANCE OF TDM SEQUENCING FOR PACKET PROCESSING ENGINES USING A DELAY LINE

(75) Inventors: Naveen K. Jain, San Jose, CA (US); Venkata Rangavajjhala, Fremont, CA (US)

(73) Assignee: Tellabs Operations, Inc., Naperville, IL (US)

( * ) Notice: Subject to any disclaimer, the term of this patent is extended or adjusted under 35 U.S.C. 154(b) by 142 days.

(21) Appl. No.: 12/024,806

(22) Filed: Feb. 1, 2008

(51) Int. Cl.
*H04Q 11/04* (2006.01)
(52) U.S. Cl. .......................... 370/366; 370/383
(58) Field of Classification Search .......... 370/394, 370/360–388
See application file for complete search history.

(56) References Cited

U.S. PATENT DOCUMENTS

| | | | | |
|---|---|---|---|---|
| 5,414,705 A * | 5/1995 | Therasse et al. | 370/352 |
| 5,481,536 A * | 1/1996 | Reisch et al. | 370/394 |
| 5,483,523 A * | 1/1996 | Nederlof | 370/394 |
| 5,590,122 A * | 12/1996 | Sandorfi et al. | 370/394 |
| 5,602,853 A * | 2/1997 | Ben-Michael et al. | 370/474 |
| 5,774,739 A * | 6/1998 | Angle et al. | 712/34 |
| 6,226,687 B1 * | 5/2001 | Harriman et al. | 709/246 |
| 6,735,203 B1 * | 5/2004 | Heiman | 370/394 |
| 6,862,282 B1 * | 3/2005 | Oden | 370/394 |
| 6,876,657 B1 * | 4/2005 | Brewer et al. | 370/394 |
| 7,240,347 B1 * | 7/2007 | Lim et al. | 718/100 |
| 7,590,061 B2 * | 9/2009 | Barry et al. | 370/230 |
| 7,626,987 B2 * | 12/2009 | Williams et al. | 370/394 |
| 2002/0009079 A1 * | 1/2002 | Jungck et al. | 370/389 |
| 2003/0043800 A1 * | 3/2003 | Sonksen et al. | 370/389 |
| 2003/0043848 A1 * | 3/2003 | Sonksen | 370/474 |
| 2004/0081148 A1 * | 4/2004 | Yamada et al. | 370/389 |
| 2007/0081539 A1 * | 4/2007 | Shaikli | 370/394 |

* cited by examiner

*Primary Examiner* — Ricky Ngo
*Assistant Examiner* — Ben Liu
(74) *Attorney, Agent, or Firm* — JW Law Group; James M Wu

(57) ABSTRACT

A network system, having an array of processing engines ("PEs") and a delay line, improves packet processing performance for time division multiplexing ("TDM") sequencing of PEs. The system includes an ingress circuit, a delay line, a demultiplexer, a tag memory, and a multiplexer. After the ingress circuit receives a packet from an input port, the delay line stores the packet together with a unique tag value. The delay line, in one embodiment, provides a predefined time delay for the packet. Once the demultiplexer forwards the packet to an array of PEs for packet processing, a tag memory stores the tag value indexed by PE number. The PE number identifies a PE in the array, which was assigned to process the packet. The multiplexer is capable of multiplex packets from PE array and replacing the packet with the processed packet in the delay line in response to the tag value.

23 Claims, 4 Drawing Sheets

METHOD AND APPARATUS FOR IMPROVING PERFORMANCE OF TDM SEQUENCING FOR PACKET PROCESSING ENGINES USING A DELAY LINE

FIELD

The exemplary embodiment(s) of the present invention relates to network system architectures. More specifically, the embodiment(s) of the present invention relates to packet processing engines.

BACKGROUND

To provide more information in the form of voice, video, and data at real-time rates, higher bandwidth and more computing power network systems are needed. To meet with increasing demand in computing powers and higher bandwidth network systems, various parallel processing systems have been constructed to meet such demand. A conventional parallel processing system typically employs a group of processing elements or engines to process information such as packets in parallel.

A problem associated with a parallel processing network system is that the processed packets need to be in the same order (or sequence) as the original packets received. Since different processing elements may require different processing time to process the packets, packets exiting the network system may have different sequence from the packets entering the system. The different ordering or sequence of packets can cause problems such as loss of audio signals or pixels in a picture.

A conventional approach to resolve the packet ordering problem associated with parallel processing is to force a fixed latency for each packet in a processing engine ("PE") for packet processing. In order to ensure packet sequence or ordering, the packet remains in the PE's pipe until it is scheduled (as per sequence) to leave the PE after a fixed latency. The problem with this approach is that the PE may be idling while waiting for the processed packet to leave. PE idling wastes valuable computing resources and reduces overall PE performance.

SUMMARY

A network system having an array of processing engines ("PEs") and a delay line capable of enhancing parallel packet processing for a time division multiplexing ("TDM") sequencing is disclosed. The system includes an ingress circuit, a delay line, a demultiplexer, a tag memory, and a multiplexer. Upon receipt of a packet from an input port, the delay line stores the packet together with a unique tag value. Tag value is used to identify the packet. The delay line, in one embodiment, provides a predefined time delay for the packet. Once the demultiplexer forwards the packet to an array of PEs for packet processing, a tag memory stores the tag value addressed by a PE number. The PE number identifies a PE in the array, which has been assigned to process the packet. The tag value and the PE number are used to identify the processed packet. The multiplexer is capable of replacing the packet in the delay line with the processed packet in accordance with the tag value.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
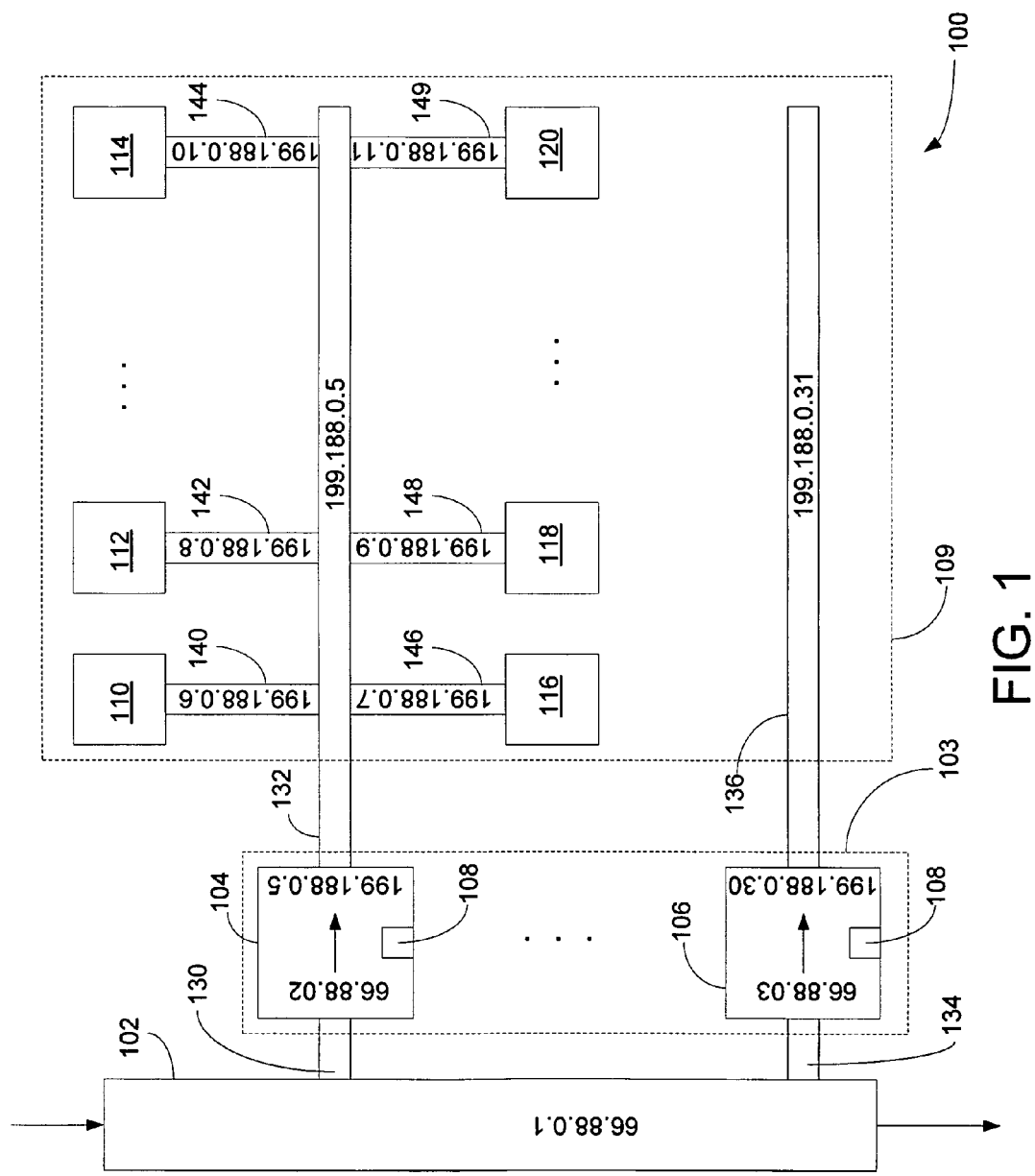
FIG. 1 is a block diagram illustrating network routing systems employing delay lines to enhance packet processing performance in accordance with one embodiment of the present invention.

Embodiment(s) of the present invention is described herein in the context of a method, device, and apparatus of improving processing performance of time division multiplexed ("TDM") parallel packet processing engines.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skilled in the art will recognize that devices of a less general purpose nature, such as hardwired devices, field programmable gate arrays (FPGAs), application specific integrated circuits (ASICs), or the like, may also be used without departing from the scope and spirit of the exemplary embodiment(s) of inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

A network system having an array of processing engines ("PEs") and a delay line capable of enhancing parallel packet processing for a time division multiplexing ("TDM") sequencing is disclosed. The system includes an ingress circuit, a delay line, a demultiplexer, a tag memory, and a multiplexer. Upon receipt of a packet from an input port, the delay line stores the packet together with a unique tag value. Tag value is used to identify the packet. The delay line, in one embodiment, provides a predefined time delay for the packet. Once the demultiplexer forwards the packet to a PE from array of PEs for packet processing, a tag memory stores the tag value addressed by a PE number. The PE number identifies a PE in the array, which has been assigned to process the packet. The tag value and the PE number are used to identify the processed packet. The multiplexer is capable of replacing the content of the packet with the content of the processed packet in the delay line in accordance with the tag value.

FIG. 1 is a block diagram 100 illustrating network routing systems employing delay lines to enhance packet processing performance in accordance with one embodiment of the present invention. Diagram 100 includes a communications network 102, a set of network routers 103, and down stream hosts 109. Down stream hosts 109, for instance, can be any types of network capable devices, such as optical converters, routers, switches, servers, printers, computers, and/or a combination of routers, servers, and computers. It should be noted that the underlying concept of the exemplary embodiment(s) of the present invention would not change if one or more blocks (circuit or circuitries) were added to or removed from diagram 100.

Network routers 103 include multiple routers, switches, and/or packet processing systems 104-106. Each router or system 104 or 106 includes a delay line 108, which, for example, is used to correct the ordering of packets in a TDM sequencing using multiple PEs. It should be noted that the ordering of packets exiting delay line 108 should be the same as the ordering of the packets entering delay line 108 regardless of actual processing time taken by each individual packet. For instance, if a first packet enters the PE array first and it takes four (4) lookup stages (or 4×432 cycles) to process while a second packet enters the PE array later and it takes two (2) lookup stages (or 2×432 cycles) to process, the first processed packet will be available later than the second processed packet. Delay line 108 is used to maintain the sequence of the packets before they leave delay line 108. It should be noted that a lookup stage or lookup cycle is assumed to be 432 clock cycles. It should be further noted that the lookup stage can be any other clock cycles, such as 400 clock cycles, 300 clock cycles, and the like.

One function of a network router or system is to receive a packet from a source and redirect the received packet to a destination via an achievable and/or efficient path or output port. While a router may use one Internet Protocol ("IP") address at its input ports, it may use a different IP address at its output ports. As shown in FIG. 1, the IP address, for example, for the input ports of device 104 is 66.88.02, and the IP address for the output ports of device 104 is 199.188.0.5. As such, each packet needs to be processed so that it can be classified and scheduled before it can be routed. A router, in one embodiment, is also capable of communicating with other routers. For example, routing device 104 may be configured to communicate with device 106. It should be further noted that routers or devices 104-106 may also be able to convert optical signals to electrical signals and vice versa.

Down stream hosts 109 further include multiple network capable devices 110-120 for distribution of packets between destinations and sources. Devices 110-120 are coupled to router 104 via connections 140-149. It should be noted that each host has a unique IP address whereby data packets can be routed accurately. For example, the IP address for device 110 is 199.188.0.6, while the IP address for device 112 is 199.188.0.8. Devices 110-120 can be any types of network capable devices, such as servers, modems, gateways, computers, switches, routers, printers, fax machines, and the like.

Each router or packet processing device 104 or 106 includes multiple port cards, wherein each port card further includes ingress circuits and egress circuits. Each ingress circuit includes one or more input ports while each egress circuit includes one or more output ports. It should be noted that packets can travel from one source address to one or more destination addresses via one or more communication networks. The communication networks include optical communication networks, electrical communication networks, wireless communication networks, and the like.

A portion of each packet such as the head portion of a packet indicates the source address(es), destination address(es), data type, and the like. For example, after extracting and reading the header of a packet, the router forwards or redirects received packet(s) to one or more of its output ports based on the information in the header. The header may be organized into multiple fields, such as fields for destination address, source address, packet type, quality of services ("QoS"), number of hops, length of payload, time stamp, and the like. As such, each packet needs to be processed to determine how and when it should be routed.

In operation, upon reading the header of a packet, router 104 or 106 determines whether to forward the packet or drop the packet based on the content of the header. For example, the packet may be dropped if its parameter(s) matches with previously identified spam parameter(s). If the packet is allowed to go forward, the router subsequently determines which output port(s) should be used to forward the packet. Router 104 may be required to convert data from one data format to another data format. For example, router 104 may receive optical signals from network 102 and subsequently, forward electrical signals to one or more destinations over copper cables 132 after converting optical signals to electrical signals. When the changes of a transmission media at the receiving end differs from the transmission media at the outputting end, each received packet not only needs to change its data format, but it also needs to change its structure. For example, since optical transmission media has different noise tolerance and data capacity from the electrical transmission media, each packet is required to be rearranged and/or chopped before they can be forwarded.

A stream of packets or a sequence of packets, which includes a series of multiple packets, may arrive at a router. The sequence of packets subsequently is assigned to one or more available PEs in the array for packet processing using a time division demultiplexing ("TDD") algorithm. Time division employs a linear time, which is divided into equally spaced time-slots. Each time slot, for example, is designed to handle transfer of a packet or a packet header from an ingress circuit to an available PE. In one embodiment, each of N consecutive time slots is assigned to a PE in a given time slot, wherein N equals the total number of PEs in the array. The PE to which the time slot is assigned, for example, will be eligible to receive an incoming packet when the PE is free and available for processing new packets. It should be noted that the packet processing time (or lookup cycles) may vary depending on the nature of the packets.

By de-coupling packet processing from packet ordering, the overall performance of PEs should be enhanced. A packet needs to occupy a PE for the duration of packet processing and it leaves the PE as soon as the processing is completed. As such, separation of packet processing from packet ordering improves PEs' computing capacity since it is capable of accepting new packet as soon as the current packet is processed.

Figure 2:
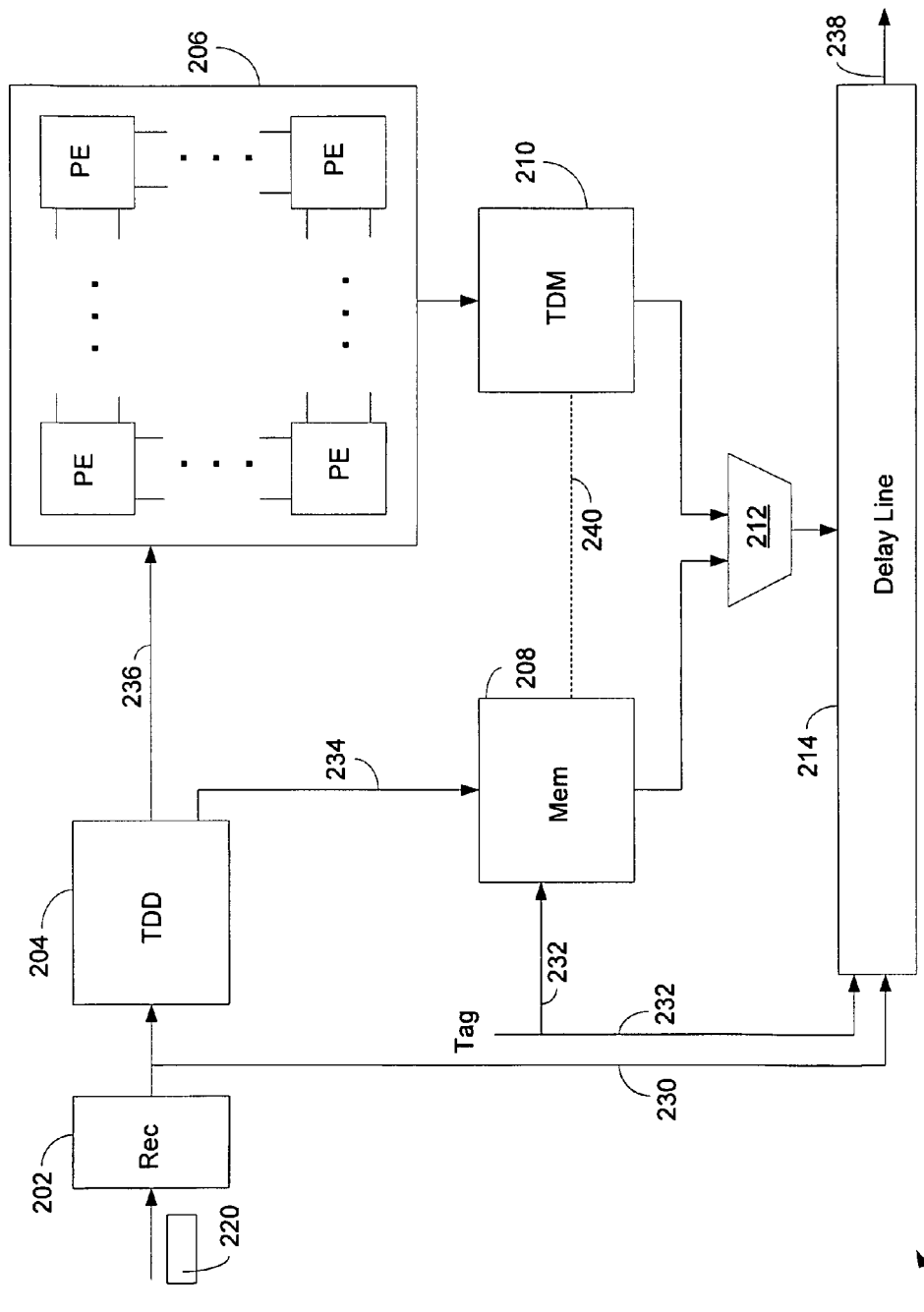
FIG. 2 is a block diagram illustrating a network system using a delay line to improve throughput of TDM sequenced parallel packet processor in accordance with one embodiment of the present invention.

FIG. 2 is a block diagram 200 illustrating a network system using a delay line to improve throughput of TDM sequenced parallel packet processor in accordance with one embodiment of the present invention. Diagram 200 includes a time division demultiplexer ("TDD") 204, a time division multiplexer ("TDM") 210, an array of PEs 206, and a delay line 214. Diagram 200 illustrates a network system, such as a network router, a network switch, a network server, a network distributor, and the like. Diagram 200 further includes an ingress circuit, which has a receiver 202 and a set of input ports. It should be noted that the ingress circuit is placed in a port card connected to a router. It should be further noted that the underlying concept of the exemplary embodiment(s) of the present invention would not change if one or more blocks (circuit or circuitries) were added to or removed from diagram 200.

The array of PEs 206 includes multiple PEs which may be organized in a 4×N PE array, where N is an integer, which may be in a range from 1 to 24. PE includes reduced instruction set computer ("RISC") processor and other packet processing functions such as cyclic redundancy check ("CRC"), User Datagram Protocol ("UDP") checksum etc. The processing array is used to provide various packet processing functions, such as, for example, packet classification, packet editing, packet scheduling and so forth.

Array 206, in one embodiment, is capable of receiving multiple packets in series, and subsequently generating processed packets in series in an order different from the received packets. Depending on the nature of the packet data (or the header), some packets are processed faster than others. The packet data may include information relating to voice, video, data, and/or a combination of voice, video, and data. It should be noted that array 206 is also capable of identifying the type of data stream, such as IP (Internet protocol) packets or ATM (Asynchronous Transfer Mode) cells.

Each PE in array 206 is a processing device or a digital processing controller, or a programmable processing unit, or the like. Each packet is assigned with a unique Tag number to identify each packet going to PE array 206. Since the sequence of processed packets exiting array 206 can be different from the sequence of original packets entering array 206, tag numbers are used to identify which PE is assigned to process which packet. Once a packet is processed, the tag number is used to match the processed packet with the original packet in delay line 214. Delay line stores each packet based on its tag number. After the storage location for the original packet is identified, the content of the original packet in delay line 214 may be modified or replaced with the content of the processed packet.

Some packets, for example, may take two (2) lookup cycles while other packets may take up to eight (8) lookup cycles to process. The lookup cycles indicate execution time required to access various lookup tables such as CAM table and results table during packet processing. It should be noted that each lookup cycle is equal to multiple clock cycles. For example, a lookup cycle equals to 432 clock cycles. Since the sequence of processed packets exiting array 206 can be different from the sequence of the packets entering array 206, delay line 214 is employed to ensure that the process packets have the same sequence as the original packets.

TDD 204 is a demultiplexer capable of receiving a packet stream from receiver 202 via channel 230 and distributing packets to PEs in time division. The packets are sent or forwarded to array 206 via a set of subchannels 236 for packet processing. Since array 206 includes multiple PEs, it can process multiple packets simultaneously to enhance the throughput of the processed packets. The processed packets, for example, may include different head information than the original packets.

TDD 204, in one embodiment, identifies available PEs or idling PEs in array 206, and assigns available PEs to process received packets. Once a packet is sent to an assigned PE, TDD 204 associates a tag number of the assigned PE with the packet. The tag number is remembered and stored for later access in memory addressed by PE number. For example, a tag number assigned by Receiver 220 is stored by TDD 204 in a tag memory 208 via connection or channel 234 addressed by PE number assigned to the respective packet.

Tag memory 208 includes a small and/or a temporary storage memory device that stores various unique tags, which are used to identify various packets. Tag memory 208, in one example, includes multiple storage entries, wherein each entry contains information relating to a packet. In one embodiment, the address to store tag value is the same as the PE number. The receiver generates tag value assuming each packet remains in PE for minimum lookup cycles of two (2) and comes out of delay line 214 after eight (8) lookup cycles. Receiver 202 is capable of generating ten (10) bit tag value, which is written by TDD 204 in tag memory 208 addressed by PE number assigned to packet by TDD 204.

TDM 210 is a multiplexer capable of selecting one packet from multiple packets from multiple subchannels and outputting the packet in series via a single channel. For example, TDM 210 may receive multiple processed packets from multiple PEs from array 206 at a given time; TDM 210 converts parallel or substantially parallel processed packets into a stream or a series of processed packets and sends the stream of processed packets to delay line 214. In one embodiment, TDM 210 retrieves the tag value from tag memory 208 and replaces the packet stored in delay line 214 with the processed packet in response to the tag value. Alternatively, TDM 210 is capable of updating the content of the packet in delay line 214 with the content of a processed packet using the tag value. The tag value, for example, may be used as memory address.

Delay line 214 is a memory, a shift register, a first-in first-out ("FIFO") register, and/or any other types of memory devices. The size of memory capacity for delay line 214 can vary depending on the maximum lookup cycles allowed for packet processing, number of PEs in array 206, and speed of arriving packets. For example, if the number of PEs is 144, number of minimum lookup for each packet is 2 lookups or 864 cycle and the speed of arriving packets is six (6) cycles/per packet, the minimum size of delay line 214 is 576 packet' deep. Every packet such as packet 220 arriving at the router or system is shifted or pushed into delay line 214 and the packet such as packet 220 departs or leaves delay line 214 after a predefined period of time. The predefined period of time, for example, is the maximum delay of time for a packet to process by PE.

Delay line 214, in one embodiment, is used to guarantee that the packets exiting a router have the same sequence as the packets entering the router. Delay line 214 further allows the content of a stored packet to be updated or rewritten in response to the content of a processed packet. A function of delay line 214 is to store the packet together with a unique tag value for a predefined time delay or a predefined maximum time period. Delay line 214 facilitates temporary storage for a packet to ensure that a packet exiting delay line 214 has the same order (or sequence) as the packet entering delay line 214. In one embodiment, the tag values are used to address the storage location of delay line 214. Alternatively, the tag values are used to access the storage location of delay line 214.

Diagram 200 further includes a device 212, which is used to identify the storage location for original packets using the tag values. Device 212, for example, retrieves the tag value associated with the PE number from tag memory 208. Upon locating the storage location of the packet in accordance with the tag value, device 212 rewrites the content of the original packet with the content of the processed packet.

Each packet, in one embodiment, is required to wait in delay line 214 for the maximum delay time period, even if the packet is updated and ready to be forwarded. Delay line 214 ensures that a packet leaves the router for destination in a correct sequence. After reaching the predefined period of time, a FIFO (first in first out) read circuit, not shown in FIG. 2, fetches the packet from delay line 214 and outputs the packet to its destination over a network.

In operation, upon receipt of packet 220, it is forwarded to TDD 204 and delay line 214. TDD 204 forwards packet 220 to an available PE in array 206 for packet processing while delay line 214 stores packet 220 for maintaining the sequence of the packet. Tag memory 208 also stores a unique tag value, which is associated with packet 220. It should be noted that the tag value may be generated by receiver 202, or other logic circuitry. Upon receipt of a processed packet 220 from array 206, TDM 210 forwards the processed packet 202 to device 212. In one embodiment, TDM 210 also informs tag memory 208 that the processed packet 220 is completed. When device 212 receives the tag value associated with packet 220, device 212 locates the storage location of original packet 220 using the tag value. The content of packet 220 is subsequently replaced with the content of the processed packet 220. It should be noted that instead of waiting for the right packet sequence in the assigned PE, the processed packets are moved to the delay line whereby the PE can process new packets. Allowing a packet to wait in delay line 214 instead of waiting in the assigned PE permits each PE to process more packets, which improves overall PE performance.

An advantage of using a delay line is to improve throughput of PE. It should be noted that packets which get classified early come out PE early and thus are not in the same order in which they entered PE. A delay pipeline or delay line makes all packets in order to forward the classified traffic. It should be noted that the delay line allows PE's to process more packets.

Figure 3:
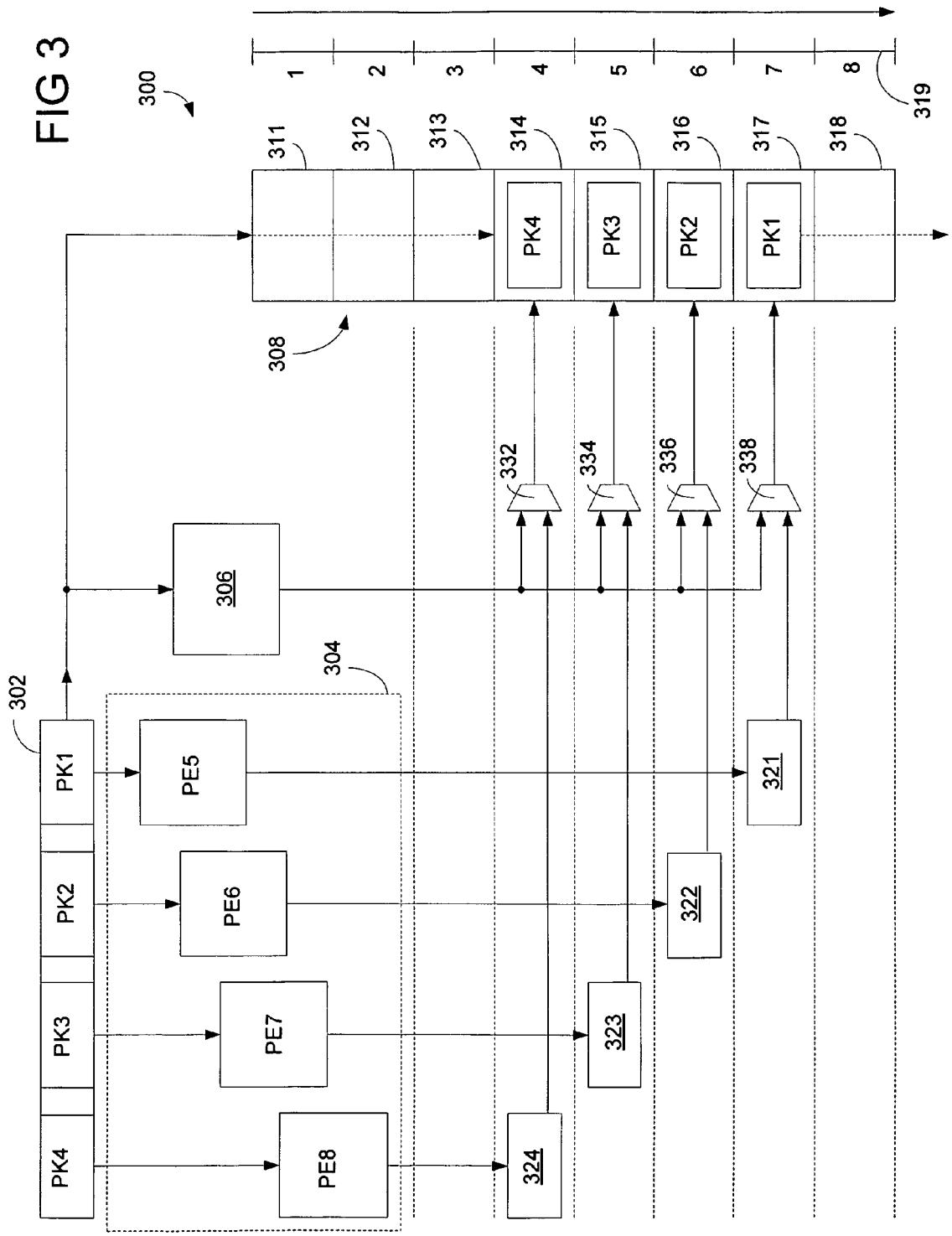
FIG. 3 is an exemplary block diagram illustrating an example of using a delay line to improve throughput of TDM sequenced parallel packet processor in accordance with one embodiment of the present invention.

FIG. 3 is an exemplary block diagram 300 illustrating an example of using a delay line to improve throughput of TDM sequenced of parallel packet processor in accordance with one embodiment of the present invention. Diagram 300 includes a stream of packets 302, a PE array 304, a tag memory 306, and a delay line 308. Diagram 300 further includes a lookup cycle indicator 319, which indicates eight (8) lookup cycles. For this example, the maximum time delay or the predefined time period assumes to be eight (8) lookup delay cycles. It should be noted that the underlying concept of the exemplary embodiment(s) of the present invention would not change if one or more blocks (circuit or circuitries) was added to or removed from diagram 300.

Stream of packets 302, in this example, includes four packets PK1-PK4, wherein each packet may include head portion.

Array 304 includes four processing engines PE5-PE8, wherein PE5-PE8 are configured to receive PK1-PK4, respectively. It should be noted that PE5-PE8 may or may not receive PK1-PK4 simultaneously. As shown in FIG. 3, PE5 receives PK1 first and then PE6 receives PK2 next. PE8 may receive PK4 after PE7 receives PK3. Unique tag values associated to PK1-PK4 are subsequently stored in tag memory 306. PK1-PK4 are stored or shifted into delay line 308.

At lookup cycle 4, PE8 finishes packet processing for PK4 and generates a processed packet 324 in accordance with PK4. Processed packet 324 is subsequently forwarded to device 332. Device 332 replaces the content of PK4 with the content of processed packet 324 at storage location 314. At lookup cycle 5, PE7 completes packet processing for PK3 and generates a processed packet 323 in response to PK3. Processed packet 323 is then forwarded to device 334. Device 334 replaces the content of PK3 with the content of processed packet 323 at storage location 315. At lookup cycle 6, PE6 completes packet processing for PK2 and generates a processed packet 322 in accordance with PK2.

Processed packet 322 is subsequently forwarded to device 336. Device 336 replaces the content of PK2 with the content of processed packet 322 at storage location 316. At lookup cycle 7, PE5 finishes packet processing for PK1 and generates a processed packet 321 in accordance with PK1. Processed packet 321 is then forwarded to device 338. Device 338 replaces the content of PK1 with the content of processed packet 321 at storage location 317. It should be noted that a stream of processed packets PK1-PK4 exiting delay line 308 has the same sequence as stream of packet 302 entering delay line 308 even though packets PK1-PK4 require different lookup cycles to complete the packet processing.

Packet processing within PEs array takes place in multiple of lookup cycles, wherein each lookup cycle is equal to N clock cycles. Each packet, for example, enters the processing engine array (PE array) with its own tag value and is demultiplexed via a TDD module to an individual PE. With PE number as index, tag value is written to a tag memory. Tag and packet are stored in delay line, which is a pipeline matched with a time delay that equals to the maximum number of lookup cycles allowed for processing a packet. Upon completion of processing within a PE, the updated packet is written out into the delay line at the location indicated by its corresponding tag. It overwrites the packet, which was written into the delay line when the packet was sent to the PE array.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the Internet, the method and apparatus described herein are equally applicable to other network infrastructures or other data communications environments.

Figure 4:
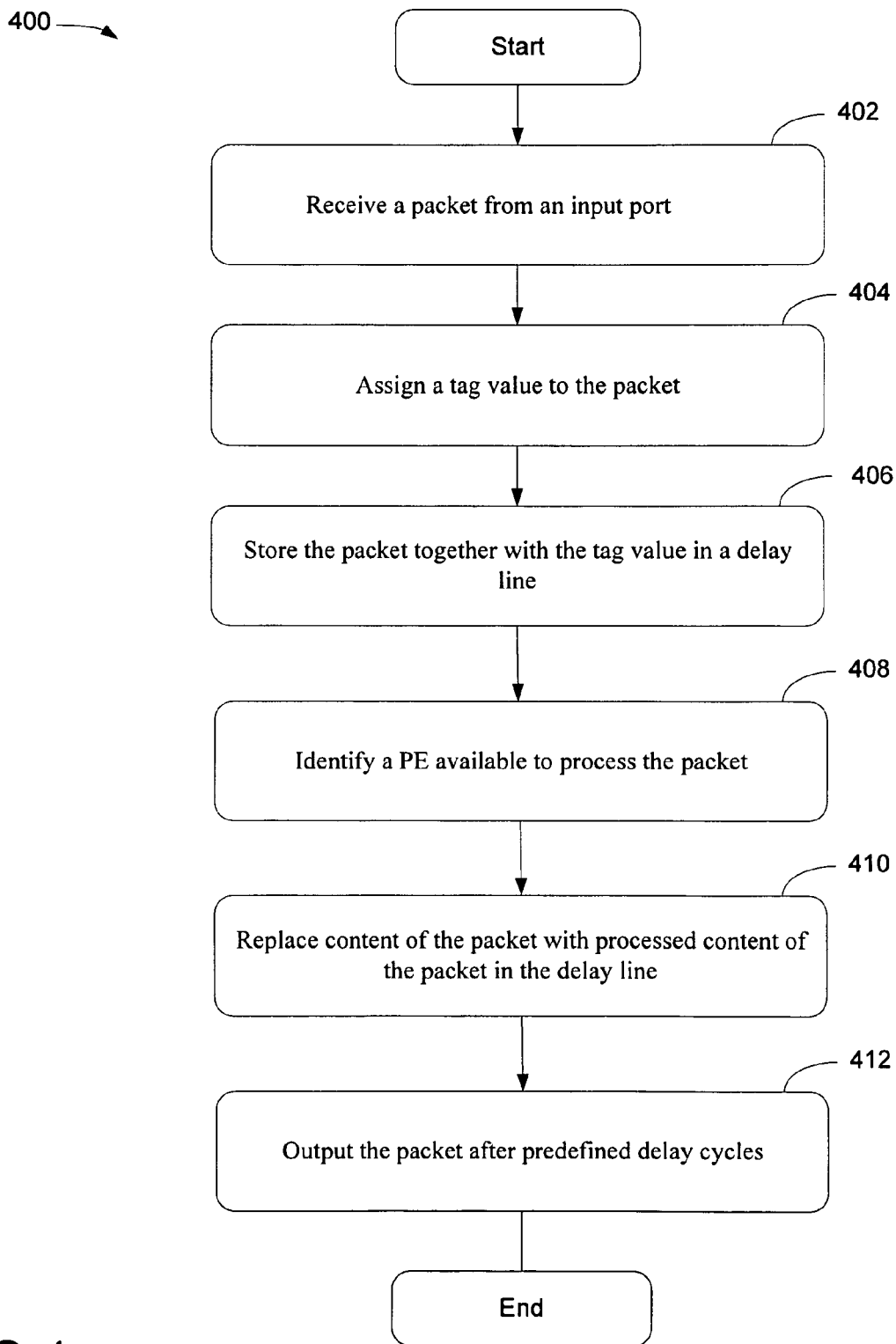
FIG. 4 is a flowchart illustrating a process of improving throughput of TDM sequenced parallel packet processor using a delay line in accordance with one embodiment of the present invention.

FIG. 4 is a flowchart illustrating a process of improving throughput of TDM sequenced parallel packet processing using a delay line in accordance with one embodiment of the present invention. At block 402, a process receives a packet from an input port. In one embodiment, the process obtains a head portion of the packet from an ingress circuit, wherein the ingress circuit is placed on a port card. After block 402, the process moves to the next block.

At block 404, the process assigns a unique tag value to the packet. The tag value is used to identify the packet. The PE number is used to identify a PE in the array, which was assigned to process the packet. After block 404, the process proceeds to the next block.

At block 406, the process stores the packet together with the tag value in a delay line. The process, in one embodiment, uses the tag value to address the storage location that stores the packet. After block 406, the process proceeds to the next block.

At block 408, the process identifies an available PE in the array for generating a processed packet in response to the packet. In one embodiment, the process is capable of distributing packets to idling PEs in the array and remembering PE numbers associated to the idling PEs. After block 408, the process proceeds to the next block.

At block 410, the process replaces the content of the packet with the content of the processed packet in the delay line indexed by the tag value. In one embodiment, the process is capable of obtaining the processed packet from the array. After retrieving the tag value from the tag memory in accordance with the PE number, the process identifies the storage location of the packet in the delay line in accordance with the tag. After block 410, the process proceeds to the next block.

At block 412, the process outputs the packet after a predefined period of time. The process is further capable of routing the packet to one or more network devices via one or more egress circuits. It should be noted that the predefined period of time should be the maximum allowed time delay for a packet to go through a packet processing. After block 412, the process ends.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network system comprising:
   an ingress circuit configured to receive a packet from an input port, wherein the ingress circuit assigns a tag value associated with the packet;
   a delay line coupled to the ingress circuit and configured to store the packet together with the tag value in a sequence based on packet arrival time in the delay line, wherein the delay line provides a predefined delay for the packet;
   a demultiplexer coupled to the ingress circuit and operable to receive the packet with the tag value and identify a processing engine ("PE") having a PE number in an array of PEs, the demultiplexer forwarding the packet to the PE for generating a processed packet;
   a tag memory coupled to the demultiplexer and configured to store the tag value addressed by the PE number; and
   a multiplexer coupled to the tag memory and the delay line, the multiplexer configured to replace the packet in the delay line with the processed packet in response to the tag value.

2. The system of claim 1, further comprising a first-in first-out ("FIFO") read circuit coupled to the delay line and configured to fetch the packet from the delay line after a predefined period of time and output the packet to a network device.

3. The system of claim 1, wherein the delay line is a temporary storage device capable of holding the packet for a predefined period of time.

4. The system of claim 1, wherein the demultiplexer is further configured to remember the PE number, wherein the PE number identifies the PE in the array assigned to process the packet.

5. The system of claim 4, wherein the demultiplexer is a time division demultiplexing ("TDD") device capable of distributing the packet to an available PE in the array of PEs to provide packet processing.

6. The system of claim 5, wherein the TDD device is capable of obtaining the PE number from the array of PEs and storing the tag number in the tag memory indexed by the PE number.

7. The system of claim 1, wherein the tag memory includes a plurality of storage entries, wherein each entry, having a tag memory field indexed by a PE number, is configured to store information relating to a packet.

8. The system of claim 1, wherein the multiplexer is a time division multiplexing ("TDM") device capable of receiving multiple packets from PE array and after time division multiplexing, updating content of the packet with content of a processed packet in the delay line in response to the tag value of the processed packet.

9. A method of a network device, comprising:
   receiving a packet from an input port;
   assigning a tag value to the packet;
   storing the packet together with the tag value in a delay line in a sequence according to packet arrival time;
   identifying an available processing engine ("PE") and a PE number associated with the PE in an array of PEs to generate a processed packet in response to the packet;
   fetching the tag value from a tag memory indexed by the PE number;
   replacing content of the packet with content of the processed packet in the delay line in response to the tag value; and
   outputting the packet after a predefined period of time.

10. The method of claim 9, wherein receiving a packet from an input port further includes obtaining a head portion of the packet from an ingress circuit placed on a port card.

11. The method of claim 9, wherein assigning a tag value to the packet further includes storing the tag value in accordance with the PE number, which identifies one of the PEs in the array assigned to process the packet.

12. The method of claim 9, wherein storing the packet together with the tag value in a delay line further includes utilizing the tag value to address a unique storage location in the delay line for storing the packet.

13. The method of claim 9, wherein identifying an available processing engine ("PE") in an array of PEs to process the packet includes distributing the packet to an idling PE in the array and remembering a PE number associated to the idling PE.

14. The method of claim 9, wherein replacing content of the packet with content of the processed packet in the delay line includes obtaining the processed packet from the array and retrieving the tag value from the tag memory in response to the PE number.

15. The method of claim 14, wherein replacing content of the packet with content of the processed packet in the delay line further includes identifying storage location of the packet in the delay line in accordance with the tag value.

16. The method of claim 9, wherein outputting the packet includes routing the packet to one or more network devices via one or more egress circuits after the predefined period of time.

17. An apparatus for network processing, comprising:
means for receiving a packet from an input port;
means for assigning a tag value to the packet;
means for storing the packet together with the tag value in a delay line in a sequence according to packet arrival time;
means for identifying an available processing engine ("PE") and a PE number associated with the PE in an array of PEs to generate a processed packet in response to the packet;
means for fetching the tag value from a tag memory indexed by the PE number;
means for replacing content of the packet with content of the processed packet in the delay line in response to the tag value; and
means for outputting the packet after a predefined period of time.

18. The apparatus of claim 17, wherein means for receiving a packet from an input port further includes means for obtaining a head portion of the packet from an ingress circuit placed on a port card.

19. The apparatus of claim 17, wherein means for assigning a tag value to the packet further includes means for identifying the tag value.

20. The apparatus of claim 17, wherein means for storing the packet together with the tag value in a delay line further includes means for utilizing the tag value to address a unique storage location in the delay line for storing the packet.

21. The apparatus of claim 17, wherein means for identifying an available processing engine ("PE") in an array of PEs to process the packet includes means for distributing the packet to an idling PE in the array and remembering a PE number associated to the idling PE.

22. The apparatus of claim 17, wherein means for replacing content of the packet with content of the processed packet in the delay line includes means for obtaining the processed packet from the array and retrieving the tag value from the tag memory in response to the PE number.

23. The apparatus of claim 22, wherein means for replacing content of the packet with content of the processed packet in the delay line further includes means for identifying storage location of the packet in the delay line in accordance with the tag value.

* * * * *